(12) United States Patent
Akkapeddi

(10) Patent No.: US 11,570,099 B2
(45) Date of Patent: Jan. 31, 2023

(54) SYSTEM AND METHOD FOR AUTOPARTITIONING AND PROCESSING ELECTRONIC RESOURCES

(71) Applicant: BANK OF AMERICA CORPORATION, Charlotte, NC (US)

(72) Inventor: Naga Vamsi Krishna Akkapeddi, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 318 days.

(21) Appl. No.: 16/781,678

(22) Filed: Feb. 4, 2020

(65) Prior Publication Data

US 2021/0243122 A1 Aug. 5, 2021

(51) Int. Cl.
*H04L 45/74* (2022.01)
*H04L 69/22* (2022.01)
*H04L 69/16* (2022.01)

(52) U.S. Cl.
CPC .......... *H04L 45/74* (2013.01); *H04L 69/161* (2013.01); *H04L 69/22* (2013.01)

(58) Field of Classification Search
CPC ........ H04L 45/74; H04L 69/161; H04L 69/22
See application file for complete search history.

(56) References Cited

U.S. PATENT DOCUMENTS

| | | |
|---|---|---|
| 5,442,778 A | 8/1995 | Pedersen et al. |
| 5,839,019 A | 11/1998 | Ito |
| 7,293,016 B1 | 11/2007 | Shakib et al. |
| 7,337,392 B2 | 2/2008 | Lue |
| 7,519,607 B2 | 4/2009 | Anderson, IV |
| 8,392,298 B2 | 3/2013 | Kumar et al. |
| 8,447,604 B1 | 5/2013 | Chang |
| 8,719,257 B2 | 5/2014 | Rangan |
| 8,959,116 B2 | 2/2015 | Mansfield et al. |
| 8,984,392 B2 | 3/2015 | Clarke et al. |
| 9,336,184 B2 | 5/2016 | Mital et al. |
| 9,396,276 B2 | 7/2016 | Hendrey |
| 9,632,849 B2 | 4/2017 | Pradeep et al. |
| 9,646,108 B2 | 5/2017 | Hendrey |
| 9,892,458 B1 | 2/2018 | Shearer et al. |
| 10,210,282 B2 | 2/2019 | Hendrey |
| 10,552,769 B2 * | 2/2020 | Mahakian ............... G06Q 10/08 |
| 2014/0223118 A1 | 8/2014 | Ignomirello |
| 2017/0200227 A1 | 7/2017 | Quinn |
| 2018/0330412 A1 | 11/2018 | Fredriksson et al. |

FOREIGN PATENT DOCUMENTS

| | | | | |
|---|---|---|---|---|
| CA | 2631763 A1 * | 6/2007 | ............. | G06F 15/16 |
| CA | 2684159 A1 * | 4/2010 | ............. | G06K 5/00 |
| CA | 2503629 C  * | 7/2014 | ............. | G06F 8/34 |
| CN | 105528604 B | 4/2016 | | |
| WO | WO-2005124627 A2 * | 12/2005 | ............. | G06Q 20/10 |

* cited by examiner

*Primary Examiner* — Saad A. Waqas
(74) *Attorney, Agent, or Firm* — Moore & Van Allen PLLC; Nicholas C. Russell

(57) ABSTRACT

Embodiments of the present invention provide a system for autopartitioning and processing electronic resources. The system is configured for receiving one or more electronic resources from one or more third party systems, determining that the one or more electronic resources match one or more predetermined characteristics, moving the one or more electronic resources that match the one or more predetermined characteristics into a first pipeline and processing the one or more electronic resources.

17 Claims, 6 Drawing Sheets

SYSTEM AND METHOD FOR AUTOPARTITIONING AND PROCESSING ELECTRONIC RESOURCES

BACKGROUND

Conventional architectures within an entity do not have the ability to adapt to new changes associated with electronic resources that are consumed by multiple systems within the architecture. Modifying the architecture to adapt to the new changes is not efficient as it increases the downtime of the multiple systems within the architecture. As such, there exists a need for a system for processing new changes associated with electronic resources without modifying the existing architecture.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for autopartitioning and processing electronic resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives one or more electronic resources from one or more third party systems, determines that the one or more electronic resources match one or more predetermined characteristics, and moves the one or more electronic resources that match the one or more predetermined characteristics into a first pipeline and process the one or more electronic resources.

In some embodiments, the present invention processes the one or more electronic resources based on automatically partitioning the each of the one or more electronic resources, generating a header associated with partitioning of the one or more electronic resources, assigning the header to one or more partitions associated with each electronic resource, and moving the one or more partitions to a middleware application, wherein the middleware application moves the one or more partitions to a posting application.

In some embodiments, the present invention generating the header comprises identifying number of the one or more partitions, in response to partitioning each of the one or more electronic resources, assigning a partition number to each of the one or more partitions in a sequential manner, creating the header comprising the partition number and total number of partitions.

In some embodiments, the present invention determines that all partitions of the one or more partitions are moved to the posting application.

In some embodiments, the present invention determines that all partitions of the one or more partitions are moved to the posting application based on storing each of the one or more partitions in a temporary database, in response to moving the one or more partitions to the posting application and verifying sequence of the one or more partitions.

In some embodiments, the present invention triggers posting of the one or more partitions based on determining that all the partitions are moved to the posting application, wherein the posting application posts data in the one or more partitions.

In some embodiments, the present invention verifies the sequence of the one or more partitions based on identifying partition number associated with the one or more partitions in the header of each of the one or more partitions and determining that all partition numbers associated with the sequence exist in the temporary database.

In some embodiments, the present invention determines that the one or more electronic resources do not match one or more predetermined characteristics and moves the one or more electronic resources that do not match the one or more predetermined characteristics into a second pipeline and process the one or more electronic resources.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
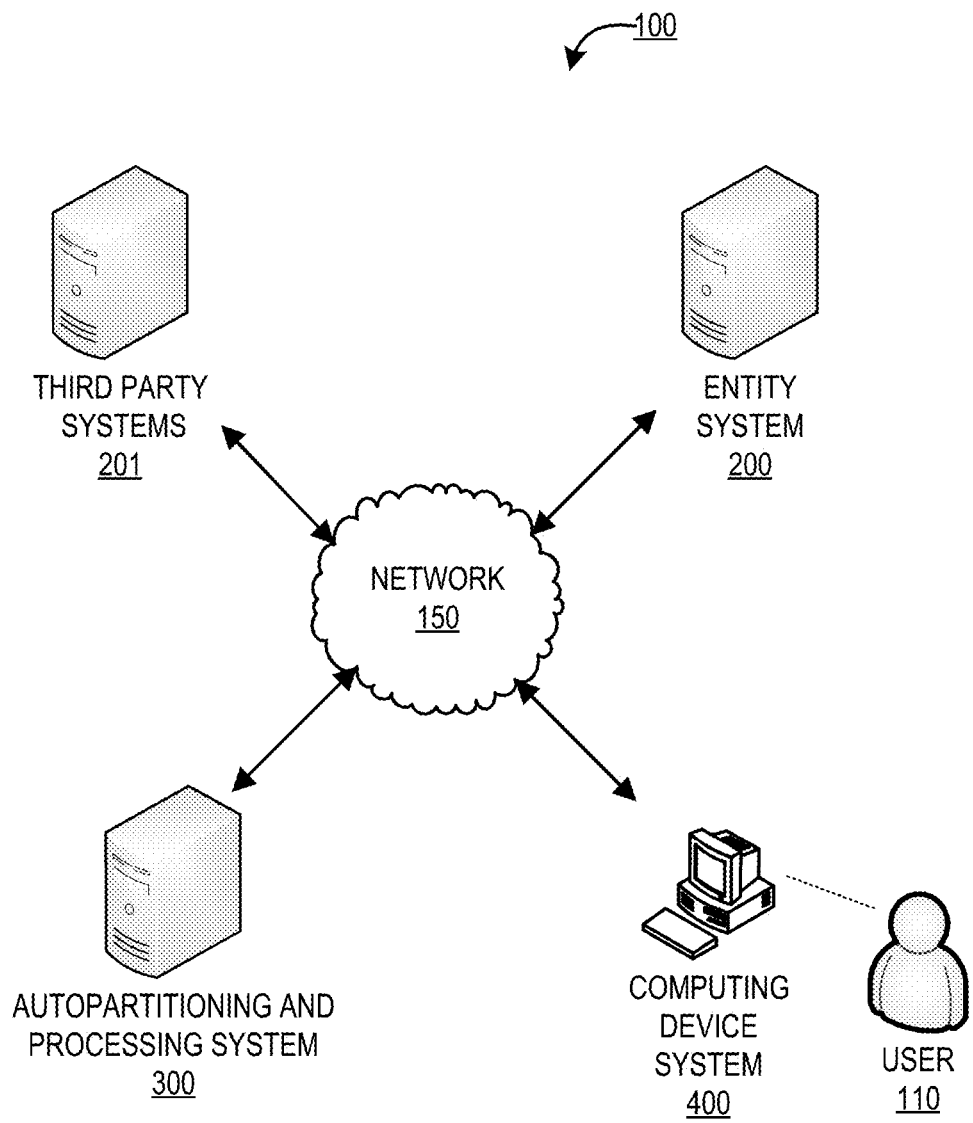
Figure 2:
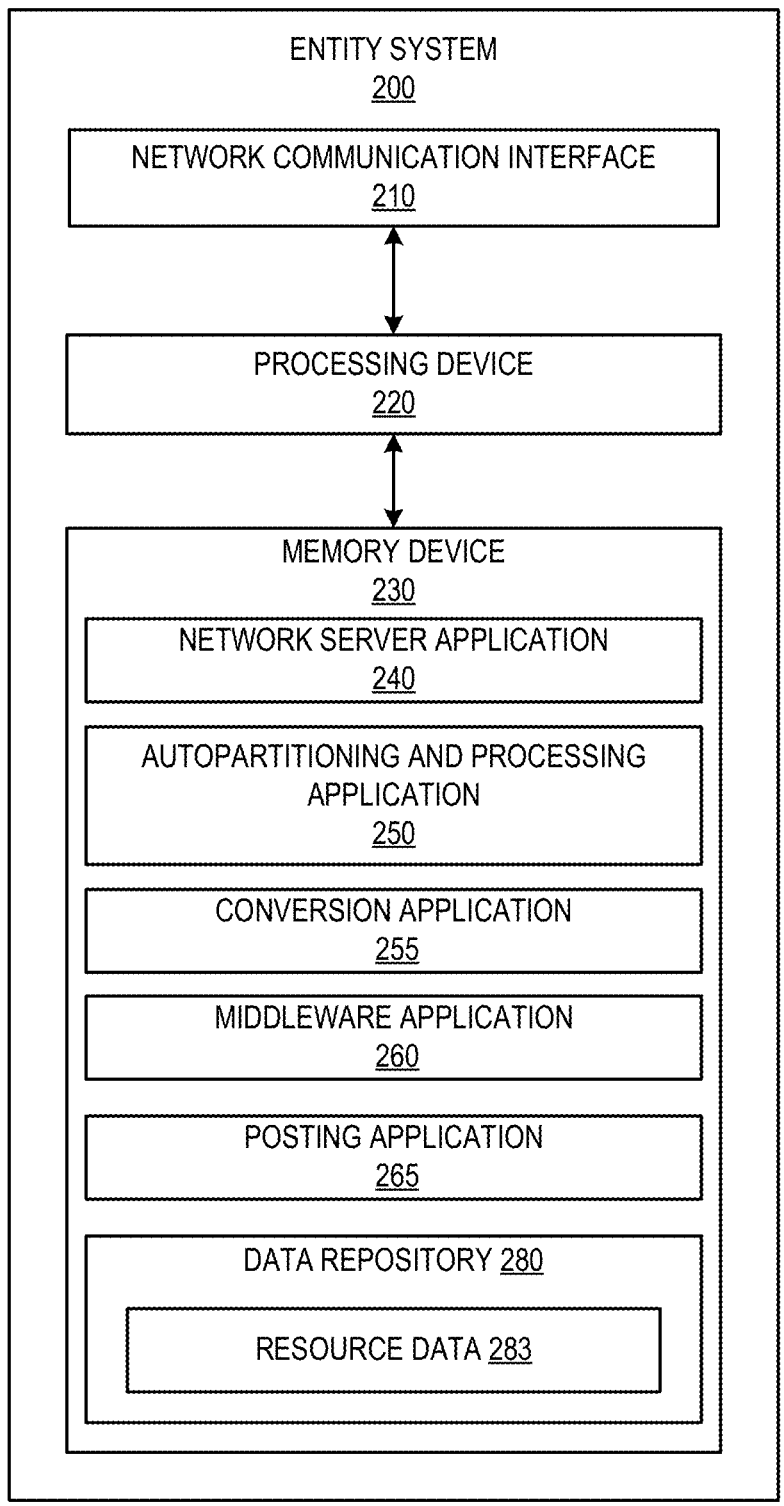
Figure 3:
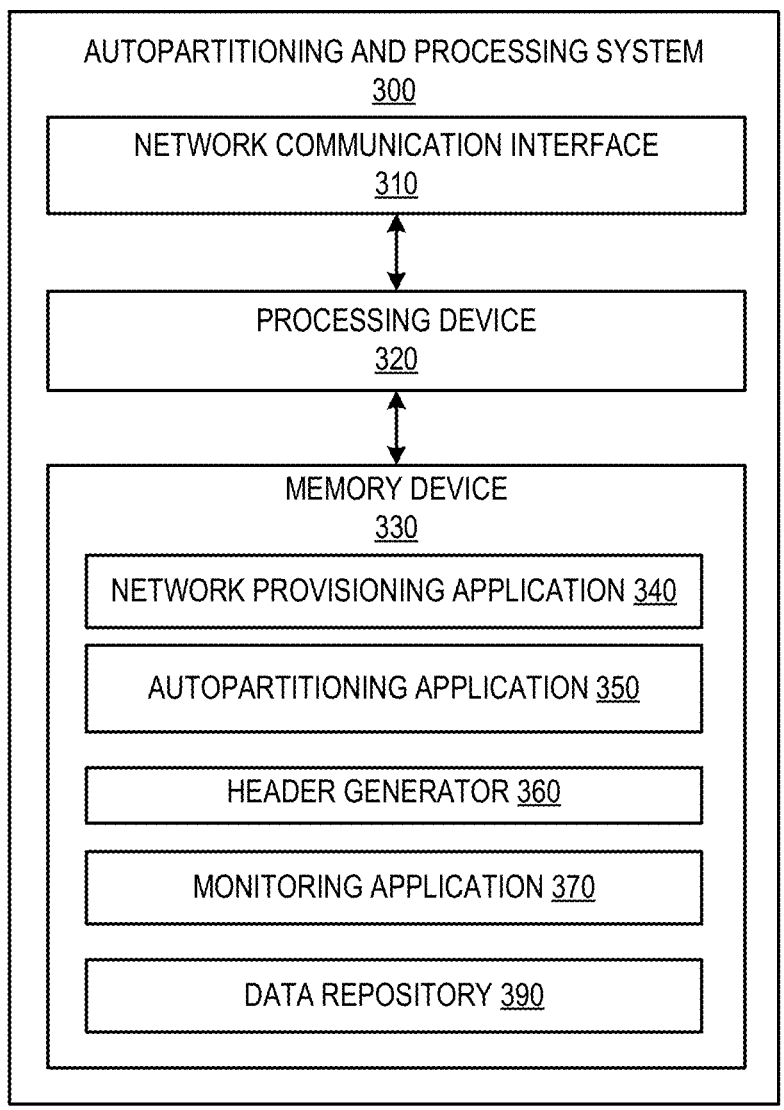
Figure 4:
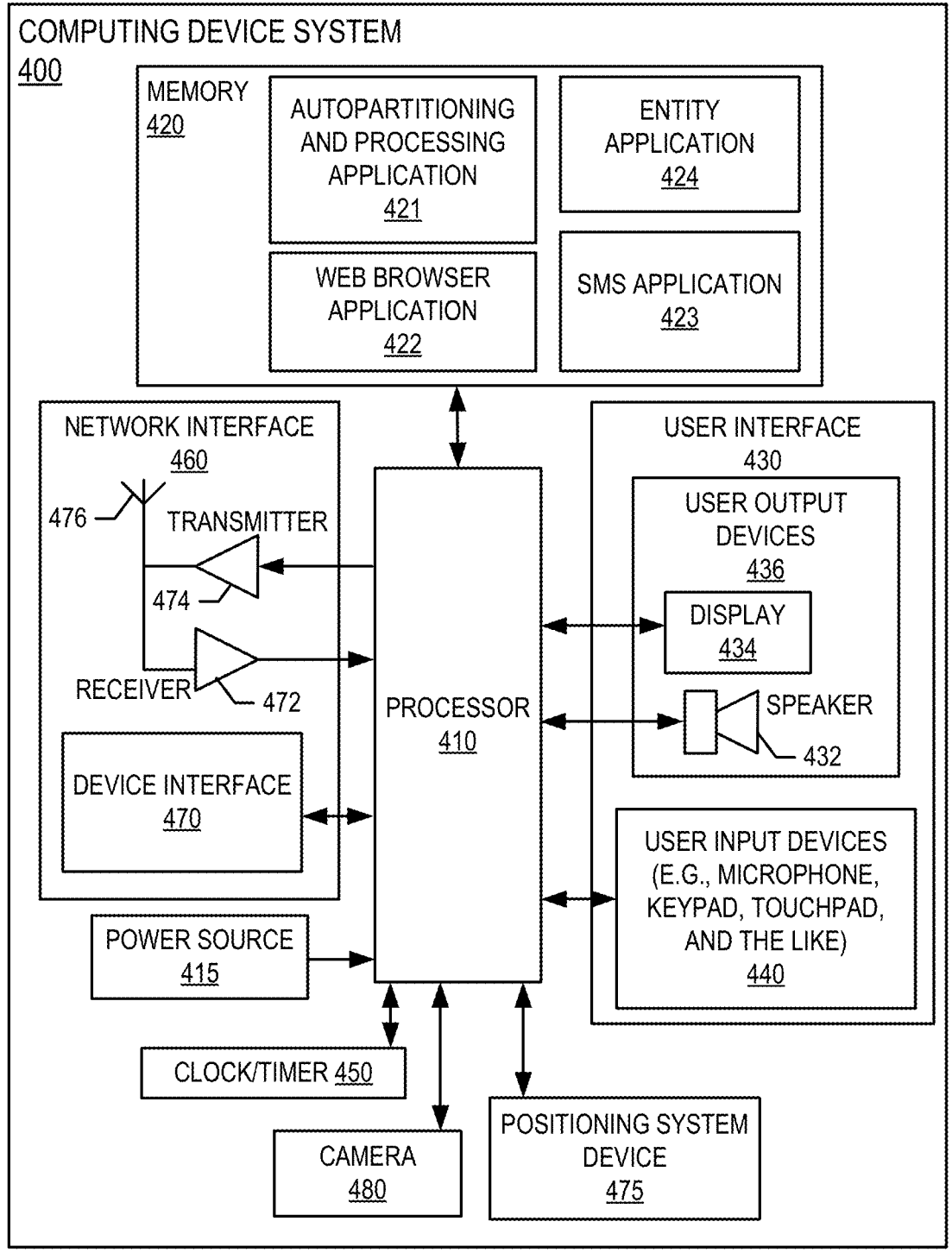
Figure 5:
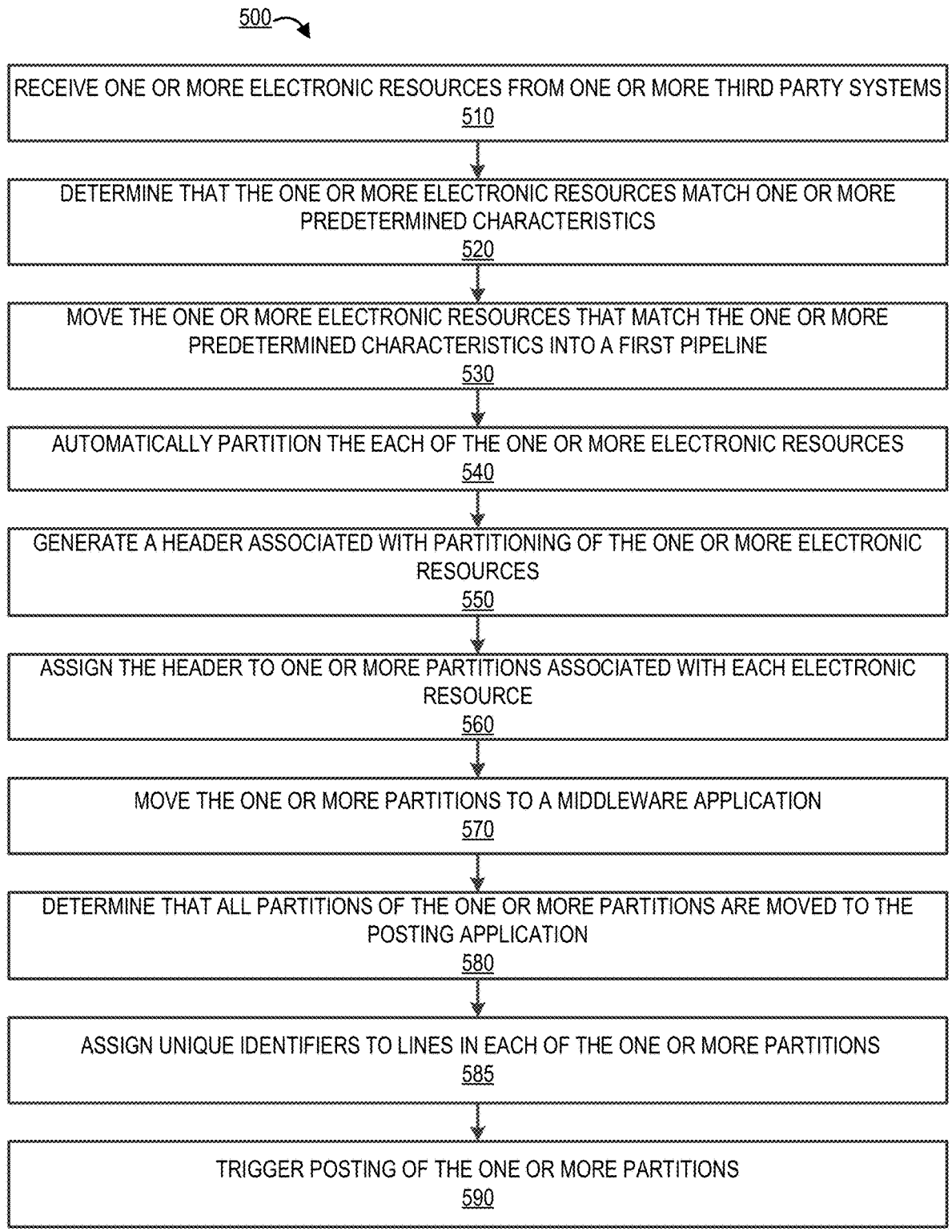
Figure 6:
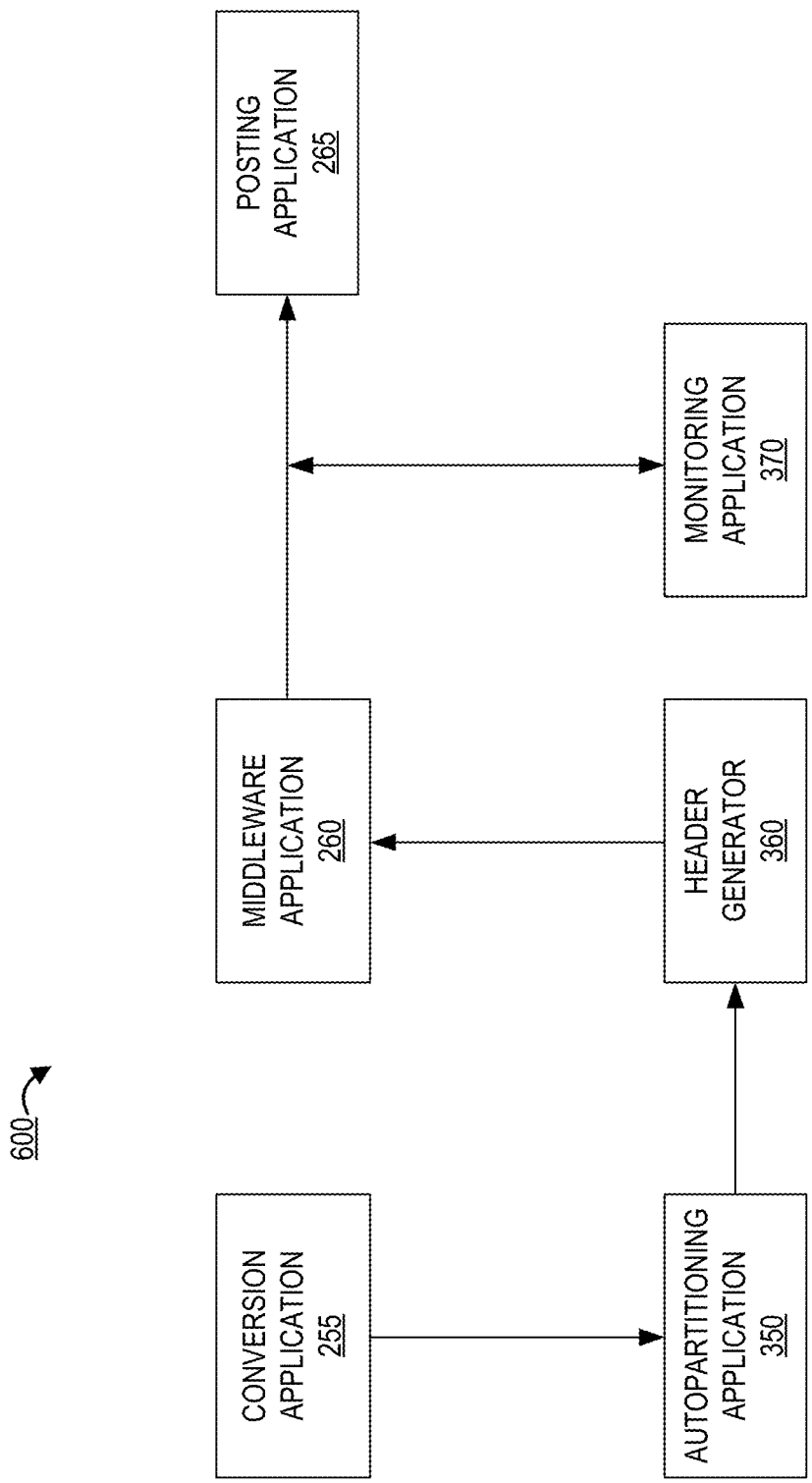

Having thus described embodiments of the invention in general terms, reference will now be made the accompanying drawings, wherein:

FIG. 1 provides a block diagram illustrating a system environment for autopartitioning and processing electronic resources, in accordance with an embodiment of the invention;

FIG. 2 provides a block diagram illustrating the entity system 200 of FIG. 1, in accordance with an embodiment of the invention;

FIG. 3 provides a block diagram illustrating an autopartitioning and processing system 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for autopartitioning and processing electronic resources, in accordance with an embodiment of the invention; and FIG. 6 illustrates a block diagram illustrating the process flow described in FIG. 5 for autopartitioning and processing electronic resources, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, management firms, insurance companies and the like. In some embodiments of the invention, the term "entity" may include any organization that is non-financial institution. In some embodiments, the term "entity" may refer to any organization that receives electronic resources from other systems or entities. In accordance with embodiments of the invention, the terms "third party system" and "other third party systems" may include any organization that provides electronic resources to the entity. In some embodiments, the third party system may be an entity that provides services or products to the entity. In some embodiments, the third party system may be an intermediary that processes electronic resources received from other third party systems. Furthermore, embodiments of the present invention use the term "user." In accordance with embodiments of the invention, a user may be an employee of the entity or the third party entity.

In accordance with embodiments of the invention, the term "electronic resource" or "resource" may be an invoice associated with the entity. The invoice may be any bill that is related to the services or products that were offered to the entity by a third party.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

FIG. 1 provides a block diagram illustrating a system environment 100 for autopartitioning and processing electronic resources, in accordance with an embodiment of the invention. As illustrated in FIG. 1, the environment 100 includes an autopartitioning and processing system 300, entity system 200, a computing device system 400, and third party systems 201. One or more users 110 may be included in the system environment 100, where the users 110 interact with the other entities of the system environment 100 via a user interface of the computing device system 400. In some other embodiments, the one or more users 110 may be employees of the entity or the third party.

The entity system(s) 200 may be any system owned or otherwise controlled by an entity to support or perform one or more process steps described herein. In some embodiments, the managing entity is a financial institution. In some embodiments, the managing entity is a non-financial institution. In some embodiments, the entity system 200 may include one or more servers.

Third party systems 201 may be any systems that provide one or more resources to the entity. In some embodiments, the third party systems 201 may be a system that provides invoices to the entity. In some embodiments, the third party systems 201 may be any intermediary systems that processes electronic resources received from other third party systems.

The autopartitioning and processing system 300 is a system of the present invention for performing one or more process steps described herein. In some embodiments, the autopartitioning and processing system 300 may be an independent system. In some embodiments, the autopartitioning and processing system 300 may be a part of the entity system 200.

The autopartitioning and processing system 300, the entity system 200, the computing device system 400, and/or the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the autopartitioning and processing system 300 is configured to communicate information or instructions with the entity system 200, the computing device system 400, and/or the third party systems 201 across the network 150.

The computing device system 400 may be a system owned or controlled by the entity of the entity system 200, the user 110, and/or a third party. As such, the computing device system 400 may be a computing device of the user 110. In general, the computing device system 400 communicates with the user 110 via a user interface of the computing device system 400, and in turn is configured to communicate information or instructions with the autopartitioning and processing system 300, entity system 200, and/or the third party systems 201 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an autopartitioning and processing application 250, a conversion application 255, a middleware application 260, a posting application 265, and a data repository 280 comprising resource data 283. The computer-executable program code of the network server application 240, the autopartitioning and processing application 250, the conversion application 255, the middleware application 260, the posting application 265, to perform certain logic, data-extraction, and data-storing functions of the entity system 200 described herein, as well as communication functions of the entity system 200.

The network server application 240, the autopartitioning and processing application 250, the conversion application 255, the middleware application 260, the posting application 265, are configured to store data in the data repository 280 or to use the data stored in the data repository 280 when communicating through the network communication interface 210 with the autopartitioning and processing system 300, the computing device system 400, and/or the third party systems 201 to perform one or more process steps described herein. In some embodiments, the entity system 200 may receive instructions from the autopartitioning and processing system 300 via the autopartitioning and processing application 250 to perform certain operations. The autopartitioning and processing application 250 may be provided by the autopartitioning and processing system 300. The conversion application 255 may be an application of the entity system 200 that is configured to receive electronic resources from the third party systems 201 and perform one or more conversions on the data associated with the electronic resources. For example, the conversion application 255 converts the incoming electronic resources into a format that is accepted by the posting application 265. The middleware application 260 is configured to process the data in the electronic resources before moving the electronic resources to the posting application 265, where posting application 265 is configured to post the electronic resources. However, the architecture associated with the conversion application 255, the middleware application 260, the posting application 265, and one or more downstream applications may be set in such a way that they process electronic resources that have certain characteristics. Any changes to the electronic resources may slow down the processing of the conversion application 255, the middleware application 260, the posting application 265, and one or more downstream applications, thereby decreasing the processing efficiency of the entity system 200 and other systems associated with the entity. As such, a need exists for a system that can adapt to the changes associated with electronic resources and process the electronic resources in such a way that the conversion application 255, the middleware application 260, the posting application 265, and one or more downstream applications process the electronic resources without having to go through any architectural changes.

FIG. 3 provides a block diagram illustrating the autopartitioning and processing system 300 in greater detail, in accordance with embodiments of the invention. As illustrated in FIG. 3, in one embodiment of the invention, the autopartitioning and processing system 300 includes one or more processing devices 320 operatively coupled to a network communication interface 310 and a memory device 330. In certain embodiments, the autopartitioning and processing system 300 is operated by a first entity, such as a financial institution, while in other embodiments, the autopartitioning and processing system 300 is operated by an entity other than a financial institution. In some embodiments, the autopartitioning and processing system 300 is owned or operated by the entity of the entity system 200. In some embodiments, the autopartitioning and processing system 300 may be an independent system. In alternate embodiments, the autopartitioning and processing system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the autopartitioning and processing system 300 described herein. For example, in one embodiment of the autopartitioning and processing system 300, the memory device 330 includes, but is not limited to, a network provisioning application 340, an autopartitioning application 350, a header generator 360, a reconciling application 370, and a data repository 390 comprising data processed or accessed by one or more applications in the memory device 330. The computer-executable program code of the network provisioning application 340, the autopartitioning application 350, the header generator 360, and the monitoring application 370 may instruct the processing device 320 to perform certain logic, data-processing, and data-storing functions of the autopartitioning and processing system 300 described herein, as well as communication functions of the autopartitioning and processing system 300.

The network provisioning application 340, the autopartitioning application 350, the header generator 360, and the monitoring application 370 are configured to invoke or use the data in the data repository 390 when communicating through the network communication interface 310 with the entity system 200, the computing device system 400, and/or the third party systems 201. In some embodiments, the network provisioning application 340, the autopartitioning application 350, the autopartitioning application 350, the header generator 360, and the monitoring application 370 may store the data extracted or received from the entity system 200, the third party system 201, and the computing device system 400 in the data repository 390. In some embodiments, the network provisioning application 340, the autopartitioning application 350, the header generator 360, and the monitoring application 370 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an autopartitioning and processing application 421, entity application 424. These applications also typically provide instructions to a graphical user interface (GUI) on the display 430 that allows the user 110 to interact with the entity system 200, the autopartitioning and processing system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the autopartitioning and processing application 421 provided by the autopartitioning and processing system 300 allows the user 110 to access the autopartitioning and processing system 300. In some embodiments, the entity application 424 provided by the entity system 200 and the autopartitioning and processing application 421 allow the user 110 to access the functionalities provided by the autopartitioning and processing system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for autopartitioning and processing electronic resources, in accordance with an embodiment of the invention. As shown in block 510, the system receives one or more electronic resources from one or more third party systems. The one or more electronic resources may be invoices received from the one or more third party systems. The one or more electronic resources received from the one or more third party systems may be in any format. In some embodiments, the electronic resource may be in the form of a text file. In some embodiments, the electronic resources may be in the form of an excel file.

As shown in block 520, the system determines that the one or more electronic resources match one or more predetermined characteristics. In some embodiments, the one or more predetermined characteristics are associated with number of lines in the one or more electronic resources. For example, the system checks if the number of lines in an electronic resource is above or below 'n' number of lines.

As shown in block 530, the system moves the one or more electronic resources that match the one or more predetermined characteristics into a first pipeline. For example, if the number of lines an electronic resource is above 'n' number of lines, the system moves the electronic resource into the first pipeline. The first pipeline may comprise a series of steps that involve processing the electronic resources via a set of applications as explained in FIG. 6.

As shown in block 540, the system automatically partitions each of the one or more electronic resources. In some embodiments, the system may automatically partition the one or more electronic resources into equal parts. In some embodiments, the system may partition the one or more electronic resources in a sequential manner. In some embodiments, the system may partition the one or more electronic resources based on a counter. For example, the system may create a partition after every 'x' number of lines. In some embodiments, the system may assign partition numbers to the partitions in a sequential manner in response to partitioning the one or more electronic resources.

As shown in block 550, the system generates a header associated with partitioning of the one or more electronic resources. The system generates the header based on total number of partitions that were created in block 540 and the partition number. For example, if an electronic resource is split into '10' partitions, the system may generate a header for a second partition comprising the total number of partitions '10' and the partition number '2'. As shown in block 560, the system assigns the header to one or more partitions associated with each electronic resource.

As shown in block 570, the system moves the one or more partitions to a middleware application. The middleware application, in some embodiments, processes data in the one or more partitions and moves the one or more partitions to the posting application, where the posting application posts the electronic resources.

As shown in block 580, the system determines that all partitions of the one or more partitions are moved to the posting application. When the middleware application moves the one or more partitions to the posting application, the system saves copies of the one or more partitions in a temporary database and verifies the sequence of the one or more partitions. The system verifies the sequence based on identifying partition number associated with the one or more partitions in the header of each of the one or more partitions and determining that all partition numbers associated with the sequence exist in the temporary database.

As shown in block 585, the system assigns unique identifiers to lines in each of the one or more partitions. In some embodiments, the middleware application may not move the one or more partitions to the posting application in a sequential manner. In such embodiments, the system after saving copies of the one or more partitions in a temporary database, assigns unique identifiers (e.g., sequence numbers) to each of the lines in each of the one or more partitions. The system assigns the unique identifiers in a sequential manner which allows the posting application to report the electronic resources without any errors. For example, the system may assign numbers '1' to 'n' to lines in a first partition and numbers 'n+1' to 'm' to lines in a second partition.

As shown in block 590, the system triggers posting of the one or more partitions. In response to determining that all partitions of the one or more partitions are moved to the posting application and assigning unique identifiers to the lines in each of the one or more partitions, the system triggers the posting process by transmitting a trigger to the posting application.

FIG. 6 illustrates a block diagram illustrating the process flow described in FIG. 5 for autopartitioning and processing electronic resources, in accordance with an embodiment of the invention. Typically, when an electronic resource is received from a third party system, the conversion application 255, the middleware application 260, and the posting application 265 that are part of a pipeline, process the electronic resources. When the incoming electronic resources meet one or more predetermined characteristics as explained above, the system moves the electronic resources into a pipeline that involves additional applications (i.e., the autopartitioning application 350, the header generator 360, and the monitoring application 370) as shown in FIG. 6. The autopartitioning application 350 partitions the one or more electronic resources as explained in block 540. The header generator 360 generates headers as explained in block 550, assigns the headers to the one or more partitions, and moves the one or more partitions to the middleware application 260. The middleware application 260 processes the one or more partitions as it processes any electronic resources that do not meet the predetermined characteristics. The middleware application 260 then moves the one or more partitions to the posting application 265 and the monitoring application 370 accounts for all the one or more partitions and triggers the posting process as explained in block 580 through block 590. The autopartitioning application 350, the header generator 360, and the monitoring application 370 process the electronic resources that meet the predetermined conditions without having to change the architecture of the existing applications and systems.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for autopartitioning and processing electronic resources, the system comprising:
   at least one network communication interface; at least one non-transitory storage device; and at least one processing device coupled to the at least one non-transitory storage device and the at least one network communication interface, wherein the at least one processing device is configured to:
   receive one or more electronic resources from one or more third party systems, wherein the one or more electronic resources are invoices in a form of electronic files;
   determine that the one or more electronic resources match one or more predetermined characteristics; move the one or more electronic resources that match the one or more predetermined characteristics into a first pipeline that comprises a first set of applications different from a second pipeline comprising a second set of applications; and in response to moving the one or more electronic resources into the first pipeline, process the one or more electronic resources, wherein processing the one or more electronic resources comprises:

automatically partitioning the each of the one or more electronic resources based on a counter;

generating a header associated with partitioning of the one or more electronic resources;

assigning the header that comprises a partition number and total number of partitions to one or more partitions associated with each electronic resource, wherein each partition further comprises a number of lines associated with each electronic resource;

assigning unique identifiers in a sequential manner to each of the number of lines in each of the one or more partitions; and moving the one or more partitions to a middleware application, wherein the middleware application moves the one or more partitions to a posting application.

2. The system of claim 1, wherein generating the header comprises: identifying number of the one or more partitions, in response to partitioning each of the one or more electronic resources; assigning a partition number to each of the one or more partitions in a sequential manner; creating the header comprising the partition number and total number of partitions.

3. The system of claim 1, wherein the at least one processing device is configured to: determine that all partitions of the one or more partitions are moved to the posting application.

4. The system of claim 3, wherein determining that all partitions of the one or more partitions are moved to the posting application is based on: storing each of the one or more partitions in a temporary database, in response to moving the one or more partitions to the posting application; and verifying sequence of the one or more partitions.

5. The system of claim 3, wherein the at least one processing device is configured to: trigger posting of the one or more partitions based on determining that all the partitions are moved to the posting application, wherein the posting application posts data in the one or more partitions.

6. The system of claim 4, wherein verifying the sequence of the one or more partitions comprises: identifying partition number associated with the one or more partitions in the header of each of the one or more partitions; and determining that all partition numbers associated with the sequence exist in the temporary database.

7. The system of claim 1, wherein the at least one processing device is configured to: determine that the one or more electronic resources do not match one or more predetermined characteristics; move the one or more electronic resources that do not match the one or more predetermined characteristics into the second pipeline and process the one or more electronic resources.

8. A computer program product for autopartitioning and processing electronic resources, the computer program product comprising a non-transitory computer-readable storage medium having computer executable instructions for causing a computer processor to perform the steps of:

receiving one or more electronic resources from one or more third party systems, wherein the one or more electronic resources are invoices in a form of electronic files;

determining that the one or more electronic resources match one or more predetermined characteristics; moving the one or more electronic resources that match the one or more predetermined characteristics into a first pipeline that comprises a first set of applications different from a second pipeline comprising a second set of applications; and in response to moving the one or more electronic resources into the first pipeline, processing the one or more electronic resources, wherein processing the one or more electronic resources comprises:

automatically partitioning the each of the one or more electronic resources based on a counter;

generating a header associated with partitioning of the one or more electronic resources;

assigning the header that comprises a partition number and total number of partitions to one or more partitions associated with each electronic resource, wherein each partition further comprises a number of lines associated with each electronic resource;

assigning unique identifiers in a sequential manner to each of the number of lines in each of the one or more partitions; and moving the one or more partitions to a middleware application, wherein the middleware application moves the one or more partitions to a posting application.

9. The computer program product of claim 8, wherein generating the header comprises: identifying number of the one or more partitions, in response to partitioning each of the one or more electronic resources; assigning a partition number to each of the one or more partitions in a sequential manner; creating the header comprising the partition number and total number of partitions.

10. The computer program product of claim 8, wherein the computer executable instructions cause the computer processor to perform the step of determining that all partitions of the one or more partitions are moved to the posting application.

11. The computer program product of claim 10, wherein determining that all partitions of the one or more partitions are moved to the posting application is based on: storing each of the one or more partitions in a temporary database, in response to moving the one or more partitions to the posting application; and verifying sequence of the one or more partitions.

12. The computer program product of claim 10, wherein the computer executable instructions cause the computer processor to perform the steps of triggering posting of the one or more partitions based on determining that all the partitions are moved to the posting application, wherein the posting application posts data in the one or more partitions.

13. A computer implemented method for autopartitioning and processing electronic resources, wherein the computer implemented method comprises:

receiving one or more electronic resources from one or more third party systems, wherein the one or more electronic resources are invoices in a form of electronic files;

determining that the one or more electronic resources match one or more predetermined characteristics; moving the one or more electronic resources that match the one or more predetermined characteristics into a first pipeline that comprises a first set of applications different from a second pipeline comprising a second set of applications; and in response to moving the one or more electronic resources into the first pipeline, processing the one or more electronic resources, wherein processing the one or more electronic resources comprises:

automatically partitioning the each of the one or more electronic resources based on a counter;

generating a header associated with partitioning of the one or more electronic resources;

assigning the header that comprises a partition number and total number of partitions to one or more partitions associated with each electronic resource, wherein each partition further comprises a number of lines associated with each electronic resource;

assigning unique identifiers in a sequential manner to each of the number of lines in each of the one or more partitions; and moving the one or more partitions to a middleware application, wherein the middleware application moves the one or more partitions to a posting application.

14. The computer implemented method of claim 13, wherein generating the header comprises: identifying number of the one or more partitions, in response to partitioning each of the one or more electronic resources; assigning a partition number to each of the one or more partitions in a sequential manner; creating the header comprising the partition number and total number of partitions.

15. The computer implemented method of claim 13, wherein the computer implemented method further comprises determining that all partitions of the one or more partitions are moved to the posting application.

16. The computer implemented method of claim 15, wherein determining that all partitions of the one or more partitions are moved to the posting application is based on: storing each of the one or more partitions in a temporary database, in response to moving the one or more partitions to the posting application; and verifying sequence of the one or more partitions.

17. The computer implemented method of claim 15, wherein the computer implemented method further comprises triggering posting of the one or more partitions based on determining that all the partitions are moved to the posting application, wherein the posting application posts data in the one or more partitions.

* * * * *